US006968451B2

(12) United States Patent
Neuman

(10) Patent No.: US 6,968,451 B2
(45) Date of Patent: Nov. 22, 2005

(54) METHOD FOR OPERATING A DISK DRIVE DURING BOOT PROCESS AT A SLOW RATE OF ROTATION LESS THAN A FAST ROTATION RATE FOR READING NON-BOOT DATA

(75) Inventor: Paul Neuman, Claix (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 10/187,429

(22) Filed: Jul. 2, 2002

(65) Prior Publication Data

US 2003/0033513 A1 Feb. 13, 2003

(30) Foreign Application Priority Data

Jul. 3, 2001 (EP) ................................ 01410079

(51) Int. Cl.[7] .......................... G06F 9/24; G11B 19/28

(52) U.S. Cl. ........................... 713/1; 713/2; 369/47.39

(58) Field of Search .................... 386/125; 360/73.03; 713/1, 2; 369/30.27, 47.39; 711/113

(56) References Cited

U.S. PATENT DOCUMENTS

| | | | | |
|---|---|---|---|---|
| 5,577,234 | A | 11/1996 | Hanabusa et al. | |
| 5,659,799 | A * | 8/1997 | Wu et al. | 710/57 |
| 6,067,203 | A * | 5/2000 | Ottesen et al. | 360/73.03 |
| 6,400,892 | B1 * | 6/2002 | Smith | 386/125 |
| 6,430,663 | B1 * | 8/2002 | Ding | 711/162 |
| 6,741,414 | B1 * | 5/2004 | Boyd et al. | 360/73.03 |
| 2002/0048245 | A1 * | 4/2002 | Hsu | 369/53.37 |

* cited by examiner

*Primary Examiner*—Chun Cao
*Assistant Examiner*—Suresh K Suryawanshi

(57) ABSTRACT

When a system boot procedure is initiated in a computer having a disk drive including one or more disks, the one or more disks are rotated at a first, slow rate while boot data are read from the disk drive. Thereafter, while non-boot data are read from the disk drive, the disks are rotated at a second, fast operational rate.

15 Claims, 3 Drawing Sheets

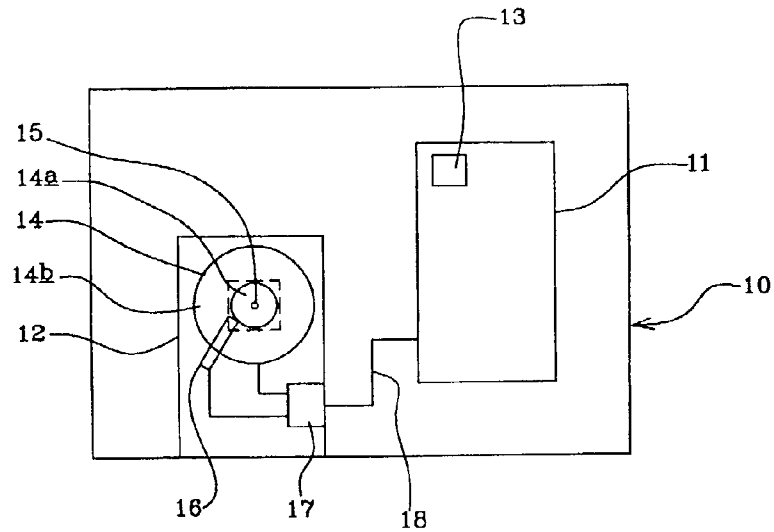
FIG 1
FIG 4a
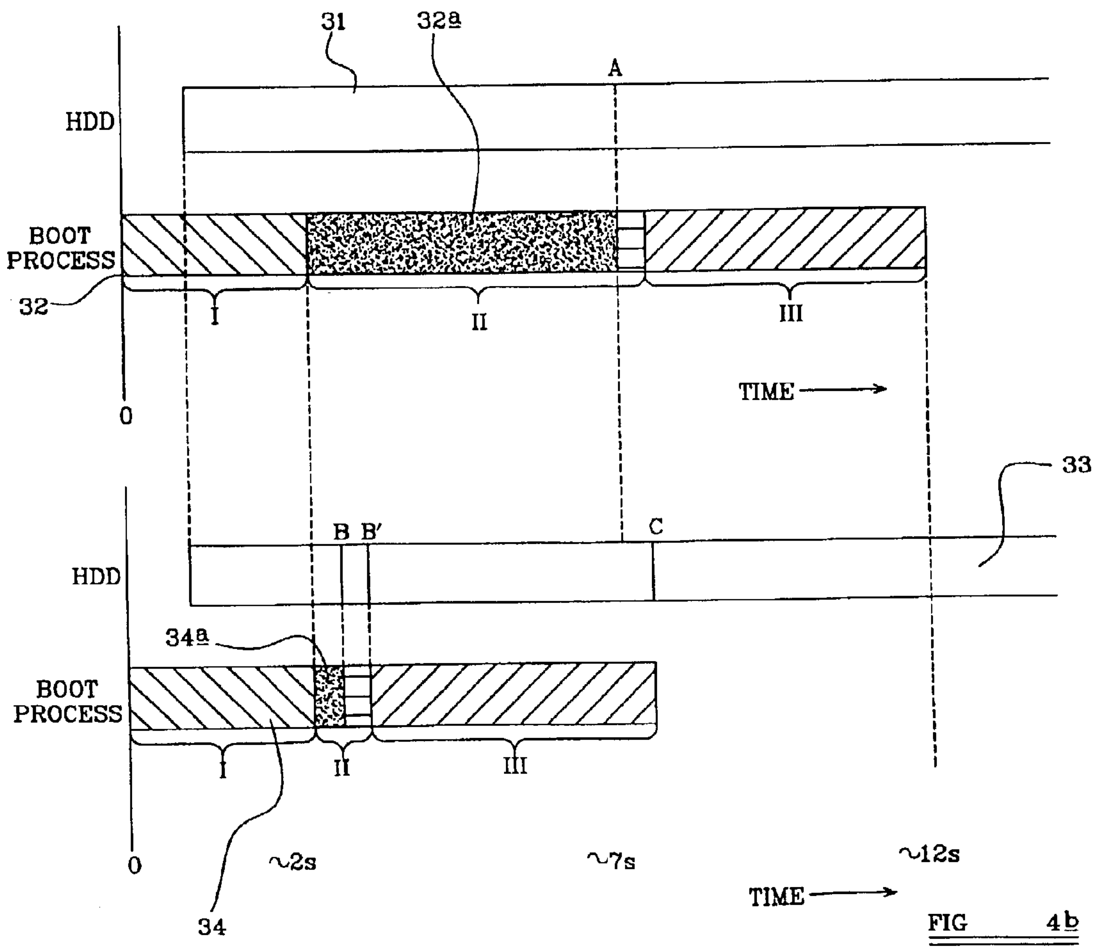
FIG 4b
C18674

METHOD FOR OPERATING A DISK DRIVE DURING BOOT PROCESS AT A SLOW RATE OF ROTATION LESS THAN A FAST ROTATION RATE FOR READING NON-BOOT DATA

DESCRIPTION OF INVENTION

This invention relates to a method of performing a system boot in a computer comprising a disk drive, a controller for a disk drive and a disk drive provided with said controller.

BACKGROUND OF THE INVENTION

Personal computers are conventionally provided with a storage medium comprising a hard disk drive. A hard disk drive conventionally comprises a plurality of platters or disks on which data is recorded on the upper and lower surfaces. To enable data to be read from or written to the disks, the disks are spun at a substantially constant operational rate of rotation by a suitable motor. To improve the speed of data transfer and reduce latency, that is the delay in reading data from a platter, the operated rate of rotation has been increased as hard disk drives have been developed. Originally, all hard disk drives spun at 3600 rpm but development has led to hard disk drives with operational rates of rotation of 15000 rpm and above.

A problem with high rotational rates for hard disk drives is that the time taken to spin up the disks to the operational rate of rotation is greater than would be required for a lower rate of rotation. When a computer is turned on and performs a system boot, it is conventionally necessary during the system boot procedure to read from a so-called boot sector of the hard disk drive. If the hard disk drive has not yet reached its operational rate of rotation, the system boot procedure waits for the disk to reach its operational rate of rotation before continuing. This leads to an undesirable delay in the system boot procedure.

An aim of the present invention is to reduce or overcome the above problem.

SUMMARY OF THE INVENTION

According to a first aspect of the present invention, we provide a method of performing a system boot in a computer comprising a disk drive having at least one disk comprising the steps of initiating a system boot procedure, operating the disk drive to rotate the at least one disk at a first rate of rotation, reading boot data from the at least one disk and operating the disk drive to rotate the at least one disk at a second rate of rotation.

The method may comprise the step of completing the system boot procedure and, when the at least one disk is rotating at the second rate of rotation, commencing an operating system boot procedure.

The method may comprise the step of reading data from the disk drive at a first data rate when the at least one disk is rotating at its first rate of rotation, and reading data from the disk drive at a second data rate when the at least one disk is rotating at its second rate of rotation.

The method may comprise the step, following reading the boot data from the disk drive, of sending a signal to a disk drive controller to cause the at least one disk to rotate at its second rate of rotation.

The first rate of rotation may be slower than the second rate of rotation.

According to a second aspect of the present invention we provide a controller for a disk drive comprising at least one disk, operable on commencing operation to rotate the at least one disk at a first rate of rotation, and on receipt of a signal, to rotate the at least one disk at a second rate of rotation.

The controller may be operable to read data from the disk at a first data rate when the at least one disk is rotating at the first rate of rotation, and operable to read data at a second data rate when the at least one disk is rotating at its second rate of rotation.

According to a third aspect of the invention, we provide a disk drive comprising at least one disk and a controller according to the second aspect of the invention, wherein the at least one disk comprises a first data portion and a second data portion, wherein data to be read when the at least one disk is rotating at its first rate of rotation are stored in said first data portion, and wherein data to be read when the at least one disk is spinning at its second rate of rotation are stored in its second data portion.

BRIEF DESCRIPTION OF THE DRAWINGS

The invention will now be described by way of example only with reference to the accompanying drawings, wherein:

FIG. 1 is a diagrammatic view of a computer provided with a disk drive embodying the present invention;

Figure 2:
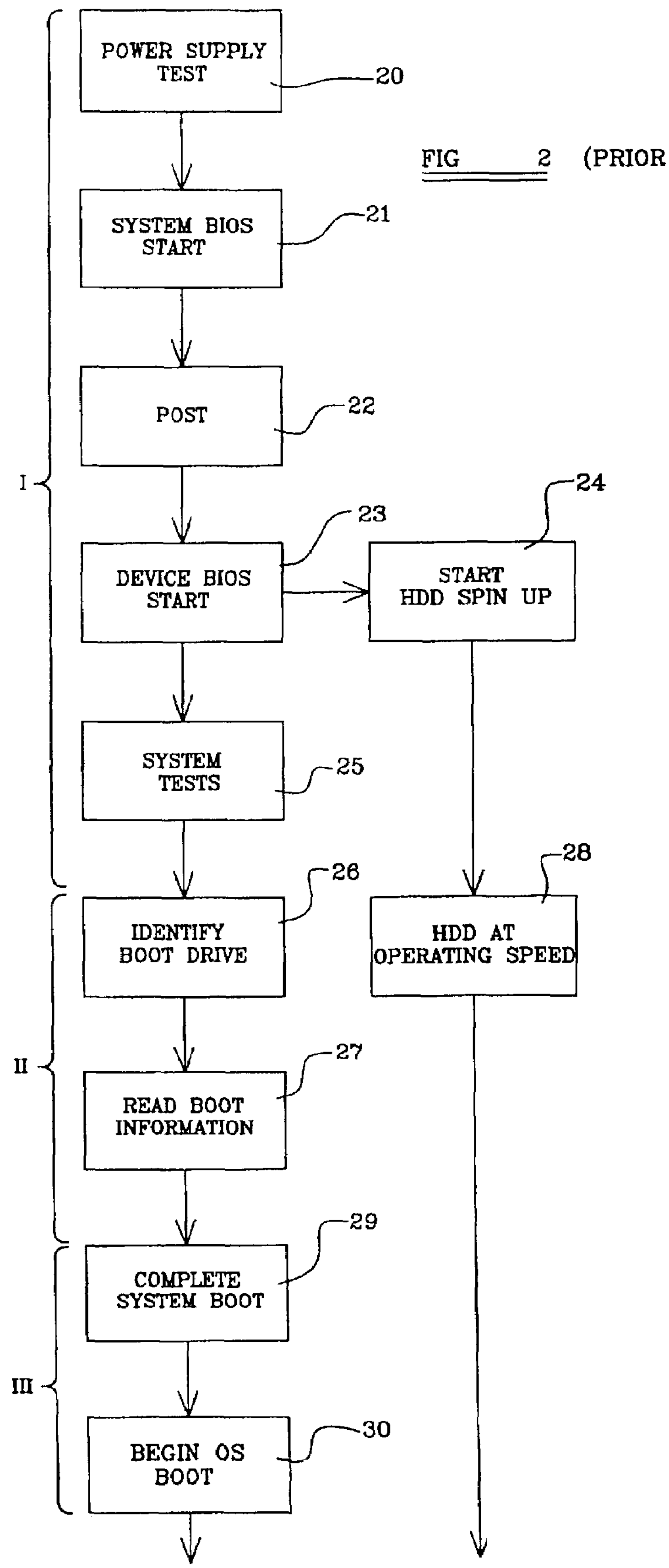
FIG. 2 is a flow diagram showing a conventional system boot procedure.

FIG. **4*a* is a time line for the system boot procedure of FIG. 2**; and

Figure 3:
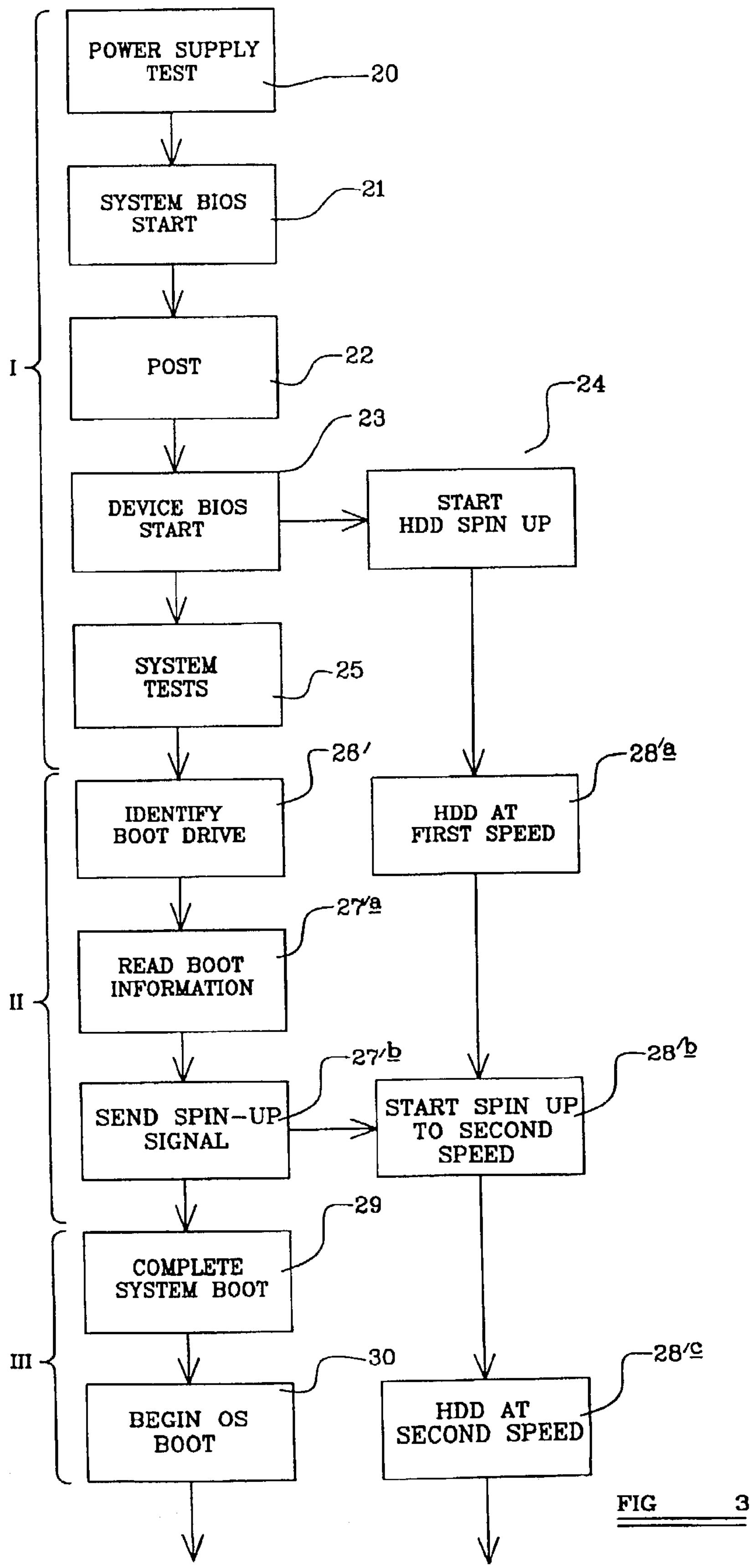
FIG. 3 is a flow diagram of a system boot procedure embodying the present invention.

FIG. **4*b* is a timeline for the system boot procedure of FIG. 3**.

DETAILED DESCRIPTION OF THE DRAWINGS

Referring to FIG. 1, a computer is shown at 10, provided with a motherboard 11 and a hard disk drive 12. The motherboard 11 is provided with a system BIOS ROM 13 which is operable to perform a boot procedure to boot the computer 10 on power up or reset. The hard disk drive 12 comprises a plurality of disks or platters 14 which are rotatable by means of a spindle motor 15 and readable by a set of reading heads 16. The hard disk drive 12 is provided with a controller 17 which controls operation of the head 16 and motor 15, and is operable to transmit data read from the disks 14 via a suitable bus 18, to, for example, the motherboard 11.

Referring to FIG. 2, a conventional system boot procedure is summarized in diagrammatic form. Beginning with part I of the system boot procedure, on power up, the power supply (not shown) performs a self test until a stable power supply is established as shown at step 20. At step 21, the system BIOS ROM is initiated. At step 22, the system BIOS performs the power on self test (POST), and at step 23, the system BIOS executes various device BIOS's, including the video card BIOS (not shown) and the hard disk drive BIOS (not shown). The hard disk drive controller 17 at this point starts to spin up the plurality of disks 14 as shown at step 24. At step 25, the BIOS performs various system tests in conventional manner.

In part II of the system boot procedure, it is necessary for the system BIOS 13 to identify a drive to boot from and look for boot information. As shown in step 26, if the disks 14 of the hard disk drive 12 are not yet rotating at an operational rate, it is necessary for the system boot process to wait until the hard disk drive 12 is available. When the disks 14 of the hard disk drive 12 are rotating at an operational rate of rotation as shown at step 28, at step 26 the system BIOS 13 can identify the hard disk drive 12 as the boot drive, the system looks for a master boot record on the disks 14 and then reads the information from a boot sector. As shown in part III of the system boot procedure, the system BIOS 13 then completes the system boot procedure at step 29 and at step 30 an operating system boot procedure commences.

Referring to the timing diagram of FIG. 4*a*, the upper bar 31 represents the time taken from power-on for the hard disk drive 12 to spin the disks 14 up to their operational rate of rotation and the lower bar 32 represents the time taken to perform parts I, II and III of the system boot procedure. Time O represents power-on of the computer 10. It will be apparent that since the disks 14 have reached the operational rate of rotation at time A, approximately 7 seconds after power on, and part 1 of the system boot takes only about two seconds, there is a considerable delay of about 5 seconds shown at 32*a*, where the system boot procedure is waiting for the disks 14 of the hard disk drive 12 to reach their operational rate of rotation.

Referring now to FIGS. 3 and 4*b*, a system boot procedure embodying the present invention is diagrammatically illustrated. As will be apparent, part I of the boot procedure, that is steps 20 to 25, is exactly the same as that for the conventional boot process as shown in FIG. 2. In part II of the system boot procedure, however, the steps of identifying the boot drive 26' and reading the boot data from the boot sector of the disks 14 of the hard disk drive 12 at step 27'*a* occur once the disks 14 of the hard disk drive 12 are rotating at a first operational rate of rotation as shown at step FIG. 28'*a*. The first operational rate of rotation is preferably such that the delay between the commencement of step 26' of the system boot procedure and the disks 14 rotating at their first rate of rotation as shown at step 28'*a* is reduced or substantially minimized. Once the system BIOS 13 has identified the hard disk drive 12 as the boot drive, the system BIOS 13 then reads the boot sector of the disks 14 of the hard disk drive and the boot information as shown at step 27'*a*. Once step 27'*a* has been completed, then at step 27'*b* a signal is sent by the system BIOS 13 to the hard disk drive controller 17. As shown at step 28'*b*, the hard disk drive controller 17 then begins to spin the disks 14 up to a second operational rate of rotation.

In part III of the system boot procedure, the system BIOS 13 then performs steps 29 and 30 as shown in FIG. 2. When the system boot procedure is completed and an operating system boot procedure begins at step 30, as shown at step 28'*c* the disks 14 of the hard disk drive 12 will rotate at the second, higher, operational rate of rotation such that the operating system boot procedure is able to read data from the hard disk drive 12 at a higher data rate, thus avoiding any delay to the operating system boot procedure.

Part II thus only comprises a relatively short wait period 34*a* which the system boot procedure waits for the disks 14 to reach the first operational rate of rotation.

As seen in the timing diagram of FIG. 4*b*, on a bar 33 relating to the operation of the hard disk drive 12, the disks 14 reach their first rate of rotation at point B whereupon the system BIOS 13 is able to read boot information from the hard disk drive 12 very much earlier than in FIG. 4*a*, thus reducing the length of the wait period 34*a*. From point B to point B', the system BIOS 13 reads the boot information from the hard disk drive 12. At point B', as shown at step 28'*b* in FIG. 3 the hard disk drive controller 17 begins to spin the disks 14 up to a second operational rate of rotation. The system BIOS 13 is able to perform the final part, part III of the system boot procedure while the disks 14 spin up to the second operational rate of rotation in the time period B' to C. As will be apparent, the overall time for the system boot procedure is very much reduced.

Although there is a trade off in that at a lower operational rate of rotation, there will be a higher latency in obtaining data from the hard disk drive and the data may be read at a lower data rate, the quantity of information required for the system boot procedure is sufficiently small that the slightly longer period taken to read the boot information from the hard disk drive is substantially less than the time taken to wait for a hard disk drive to spin up to an operational rate of rotation in a conventional computer.

The disks 14 will store two data sets, the boot data which is to be read at the first, lower rate of rotation and all other data which is to be read at the higher second rate of rotation. Both data sets may be distributed anywhere on the disks 14 in a conventional manner. Alternatively, it may be advantageous to physically separate the two data sets on the disks 14. In the example shown in FIG. 1, the hard disk is shown with a first portion 14*a* comprising a group of cylinders in conventional manner comprising the boot information to be read when the disk 14 is spinning at its first rats of rotation, and a second portion 14*b*, containing all the other data stored on the hard drive 14 which may be read at the second rate of rotation. It will be apparent that the first portion and second portion may be distributed as desired over the various disks or platters making up the hard disk 14. Advantageously, the controller 17 may comprise firmware operable to map the location of the first data portion 14*a* and the second data portion 14*b* and which is also operable at step 24' to spin up the disks 14 to the first rate of rotation and on receiving the second signal at step 28'*b* to speed up the hard disks to the second rate of rotation.

Although the invention has been described with reference to a hard disk drive, it will be apparent that the invention may be applied to any similar rotating storage medium where there exists a trade-off between the time taken for the medium to be available for operation from start up, latency and rotation rate.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of performing a system boot in a computer comprising a disk drive comprising at least one disk, the method comprising the steps of:

initiating a system boot procedure;

in response to the system boot procedure being initiated, rotating the at least one disk at a first, slow rate of rotation, the slow rotation rate being less than a second, fast operational rotation rate for reading non-boot data;

reading boot data from the disk drive; and rotating the at least one disk at the second, fast operational rate of rotation during reading of non-boot data from the disk drive subsequent to reading the boot data from the disk drive while the disk rotates at a speed less than the second rate.

2. A method according to claim 1, comprising the step of sending a signal to a disk drive controller to cause the at least one disk to rotate at its second rate of rotation, the sending signal being derived in response to reading the boot data from the disk drive.

3. A controller for a disk drive comprising at least one disk, the controller being arranged to cause the drive (a) to rotate the at least one disk at a first, slow rate of rotation, the slow rotation rate being less than a second, fast operational rate for reading non-boot data, and (b) on receipt of a signal, to rotate the at least one disk at the second, fast rate of rotation during reading of non-boot data from the disk drive subsequent to reading the boot data from the disk drive while the disk rotates at a speed less than the second rate.

4. A disk drive comprising a controller according to claim 3, wherein the at least one disk comprises a first data portion and a second data portion arranged to store non-boot data to the exclusion of the boot data, wherein the boot data to be read when the at least one disk is rotating at its first rate of rotation are adapted to be stored in the first data portion, and wherein the non-boot data to be read when the at least one disk is rotating at its second rate of rotation are adapted to be stored in the second data portion.

5. A disk drive according to claim 4, wherein the controller is arranged to read the stored boot data in the first portion in response to a BIOS device of a computer including the disk drive being started.

6. A controller according to claim 3, wherein the controller is arranged to read the stored boot data in the first portion in response to a BIOS device of a computer including the disk drive being started.

7. A controller according to claim 6, wherein the controller is arranged to read the stored boot data in the first portion only while the disk is rotating at the first, slow speed.

8. A disk drive according to claim 4, wherein the controller is arranged to read the stored boot data in the first portion only while the disk is rotating at the first, slow speed.

9. A disk drive according to claim 5, wherein the controller is arranged to read the stored boot data in the first portion only while the disk is rotating at the first, slow speed.

10. A method according to claim 1, further including starting a BIOS of the computer and responding to the BIOS being started by initiating the system boot procedure.

11. A method according to claim 2, further including starting the BIOS of the computer and responding to the BIOS being started by initiating the system boot procedure.

12. A method according to claim 1, wherein the at least one disk comprises a first data portion, and a second data portion that stores non-boot data to the exclusion of the boot data, the boot data to be read when the at least one disk is rotating at its first rate of rotation being stored in the first data portion, and the non-boot data to be read when the at least one disk is rotating at its second rate of rotation are stored in the second data portion.

13. A method according to claim 2, wherein the at least one disk comprises a first data portion, and a second data portion that stores non-boot data to the exclusion of the boot data, wherein the boot data to be read when the at least one disk is rotating at its first rate of rotation being stored in the first data portion, and the non-boot data to be read when the at least one disk is rotating at its second rate of rotation are stored in the second data portion.

14. A method according to claim 13, further including reading the stored boot data in the first portion only while the disk is rotating at the first, slow speed.

15. A method according to claim 12, further including reading the stored boot data in the first portion only while the disk is rotating at the first, slow speed.

* * * * *